UNITED STATES PATENT OFFICE.

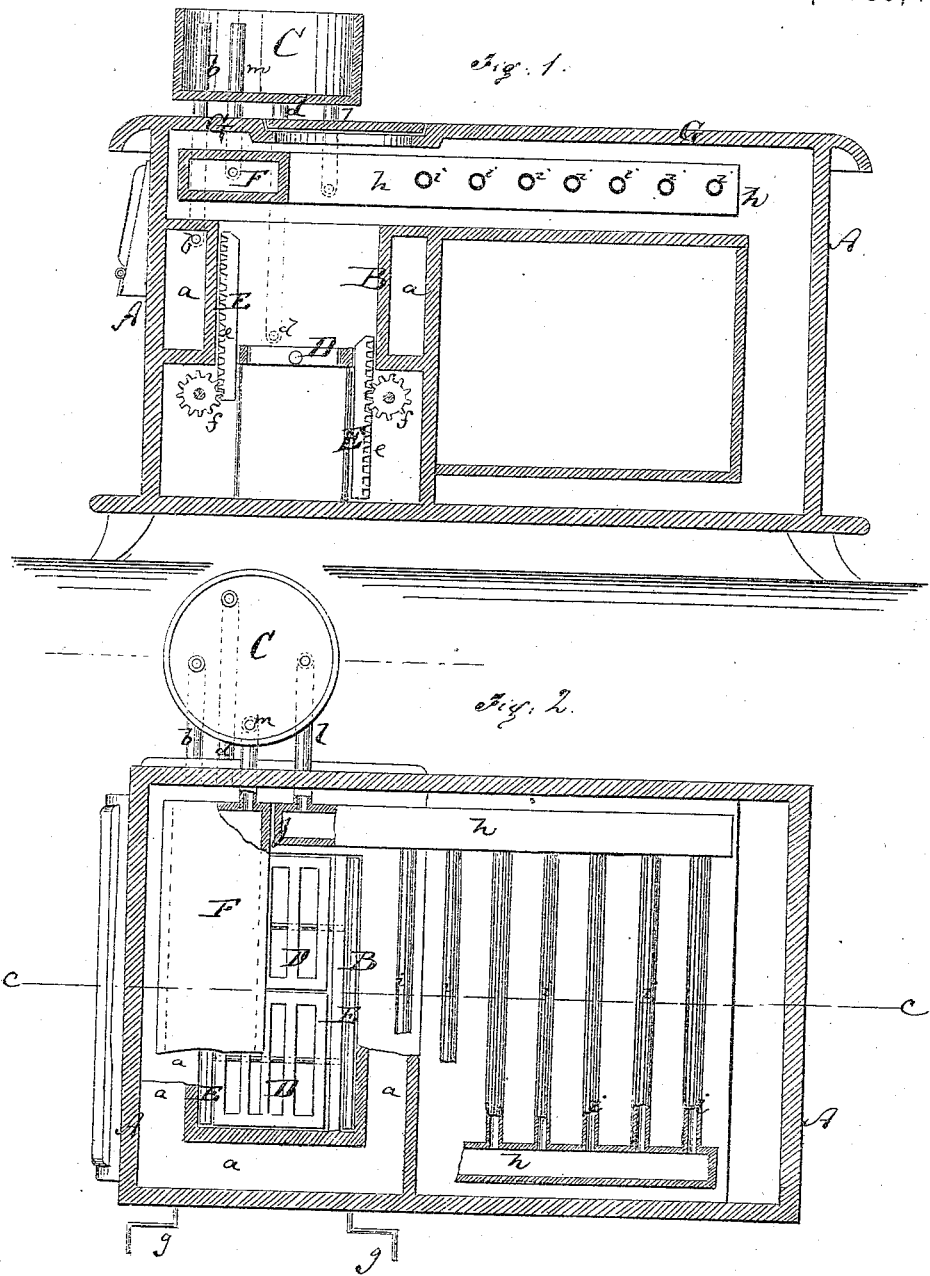

CHESTER COMSTOCK, OF NEW CANAAN, CONNECTICUT.

IMPROVEMENT IN COMBINED COOKING-STOVES AND WATER-HEATERS.

Specification forming part of Letters Patent No. 126,185, dated April 30, 1872.

Specification describing a new and Combined Stove and Water-Heater, invented by CHESTER COMSTOCK, of New Canaan, in the county of Fairfield and State of Connecticut.

Figure 1 represents a vertical longitudinal section of my improved stove, the line $c\ c$, Fig. 2, indicating the plane of section. Fig. 2 is a top view, partly in section, of the same.

Similar letters of reference indicate corresponding parts.

The invention consists, first, in providing the inner sides of the fire-box of a stove with auxiliary and adjustable sides, to lessen the fire-room and the radiation of heat therefrom on the sides; second, in suspending over the oven, between cover and fire-box, and out of range with the holes therein, a water-vessel, which is connected with cold-water vessel on top, and has certain hollow arms and pipes to give a greater heating-surface; and, thirdly, in combining these two devices with a water-chamber around the fire-box, all substantially as hereinafter described.

A in the drawing represents the body of a stove of suitable size and kind. B is the fire-box, made with hollow sides and ends to form a continuous water-chamber, $a$, which is, by pipes $b$ and $d$, connected with a boiler or other vessel, C. The surplus heat of the fire will serve to heat the water within $a$, which will circulate within the boiler. The grate D I prefer, in this kind of fire-box, to make in two sections, independently pivoted, as shown in Fig. 2. E E are two vertical slides, which are provided with toothed racks $e\ e$, that mesh into pinions $f\!f$, as shown. When these pinions are turned, by means of crank-handles $g\ g$, the slides can be moved up or down at will. When they are moved up they constitute the sides of the fire-box, reducing its width, and permitting a smaller fire, and keeping the heat more away from the chamber $a$. F is a water-vessel suspended below the stove-cover G, above the fire-box, but so as to clear the holes in the cover G. It has projecting arms $h\ h$, which reach back over the oven, and are connected by transverse pipes $i\ i$, as shown, and is at $j$ divided by a partition to insure complete circulation before the colder water coming from C, through a pipe, $l$, can return properly heated through a pipe, $m$. The smoke, passing to the flues over the oven, will give off its surplus heat to the pipes $i$. A partition similar to $j$, in F, may also be in the water-chamber $a$, for like purpose.

Having thus described my invention, I claim as new and desire to secure by Letters Patent—

1. The vertical slides E E, applied to the sides of the fire-box B, and made adjustable, substantially as and for the purpose herein shown and described.

2. The vessel F, having the arms $h\ h$, partition $j$, and circulating pipes $i\ i$, substantially as and for the purpose herein shown and described.

3. The combination of the vessel C with the hollow chamber $a$ around the fire-box, and with the chamber F, all arranged as described.

CHESTER COMSTOCK.

Witnesses:
CHAS. RAYMOND,
JOSEPH SCOFIELD.